US008993023B2

(12) United States Patent
Legan et al.

(10) Patent No.: US 8,993,023 B2
(45) Date of Patent: Mar. 31, 2015

(54) PROCESS FOR REDUCING SPORE LEVELS IN COMPOSITIONS

(75) Inventors: James David Legan, Libertyville, IL (US); Belinda Leigh Chapman, Rooty Hill (AU); Michelle Kay Bull, West Ryde (AU)

(73) Assignees: Kraft Foods Group Brands LLC, Northfield, IL (US); Commonwealth Scientific and Industrial Research Organisation, Campbell (AU)

( * ) Notice: Subject to any disclaimer, the term of this patent is extended or adjusted under 35 U.S.C. 154(b) by 255 days.

(21) Appl. No.: 12/521,723

(22) PCT Filed: Dec. 27, 2007

(86) PCT No.: PCT/US2007/088938
§ 371 (c)(1),
(2), (4) Date: Dec. 15, 2009

(87) PCT Pub. No.: WO2008/083216
PCT Pub. Date: Jul. 10, 2008

(65) Prior Publication Data
US 2010/0104721 A1    Apr. 29, 2010

Related U.S. Application Data

(60) Provisional application No. 60/882,644, filed on Dec. 29, 2006.

(51) Int. Cl.
*A23B 7/005* (2006.01)
*A23L 3/16* (2006.01)
(Continued)

(52) U.S. Cl.
CPC . *A23L 3/165* (2013.01); *A23L 3/10* (2013.01); *A23B 7/0056* (2013.01); *B65D 81/34* (2013.01);
(Continued)

(58) Field of Classification Search
CPC .... A23B 4/0056; A23B 7/0056; A23L 1/212; A23L 3/015; A23L 3/0155; A23L 3/10; B65B 25/04; B65B 25/041; B65B 31/02–31/06; B65B 55/02; B65D 81/2023; B65D 81/2061; B65D 81/2084; B65D 81/34
USPC .......................... 426/410, 412, 520–522, 524
See application file for complete search history.

(56) References Cited

U.S. PATENT DOCUMENTS 4,505,937 A * 3/1985 Demeulemeester et al. ..... 426/8
4,832,963 A * 5/1989 Demeulemeester et al. ..... 426/8
(Continued)

FOREIGN PATENT DOCUMENTS

CA        2571865      2/2006
EP        0866667 A1   9/1998
(Continued)

OTHER PUBLICATIONS

S. Rajan et al., "Combined Pressure-Thermal Inactivation Kinetics of *Bacillus amyloliquefaciens* Spores in Egg Patty Mince," Journal of Food Protection (US), 2006, 69 (4) p. 853-60 (abstract, 1 page).
(Continued)

*Primary Examiner* — Drew Becker
(74) *Attorney, Agent, or Firm* — Fitch, Even, Tabin & Flannery LLP

(57) ABSTRACT

The present invention relates to a process effective for reducing the number of spores, especially psychrotrophic spores, in compositions. More specifically, a method is provided for heating a composition at a temperature, pressure and for a time effective for reducing the number of psychrotrophic spores in the composition by at least about 3 logs. In one important aspect, the invention relates to producing vacuum packed or modified atmosphere packed chilled food products.

21 Claims, 9 Drawing Sheets

(51) Int. Cl.
| | |
|---|---|
| *A23L 3/10* | (2006.01) |
| *B65D 81/34* | (2006.01) |
| *B65B 55/02* | (2006.01) |
| *B65D 81/20* | (2006.01) |
| *B65B 31/02* | (2006.01) |
| *B65B 25/04* | (2006.01) |
| *A23L 3/015* | (2006.01) |

(52) U.S. Cl.
CPC ............ *B65B 55/02* (2013.01); *B65D 81/2084* (2013.01); *B65B 31/02* (2013.01); *B65B 25/041* (2013.01); *B65D 81/2023* (2013.01); *B65D 81/2061* (2013.01); *A23B 7/0053* (2013.01); *A23L 3/0155* (2013.01)
USPC ........................... 426/412; 426/521; 426/524

(56) References Cited

U.S. PATENT DOCUMENTS

| | | | |
|---|---|---|---|
| 6,017,572 A | 1/2000 | Meyer | |
| 6,086,936 A | 7/2000 | Wilson et al. | |
| 6,177,115 B1* | 1/2001 | Meyer | 426/521 |
| 6,207,215 B1 | 3/2001 | Wilson | |
| 6,235,338 B1* | 5/2001 | Gallant et al. | 426/643 |
| 6,426,103 B2* | 7/2002 | Voisin | 426/113 |
| 8,425,962 B2* | 4/2013 | Palleschi et al. | 426/321 |
| 2004/0071842 A1* | 4/2004 | Van Schepdael et al. | 426/281 |
| 2004/0156960 A1* | 8/2004 | Villota et al. | 426/325 |
| 2004/0191382 A1* | 9/2004 | Cooper et al. | 426/521 |
| 2005/0112252 A1* | 5/2005 | Tewari | 426/392 |
| 2006/0034980 A1* | 2/2006 | Perdue | 426/234 |
| 2006/0159813 A1* | 7/2006 | Ming et al. | 426/335 |
| 2007/0009635 A1* | 1/2007 | Voisin | 426/410 |
| 2007/0237865 A1* | 10/2007 | Love et al. | 426/129 |
| 2010/0015309 A1* | 1/2010 | Chouikhi | 426/394 |
| 2013/0230633 A1* | 9/2013 | Palleschi et al. | 426/589 |

FOREIGN PATENT DOCUMENTS

| | | |
|---|---|---|
| EP | 0866667 B1 | 9/1998 |
| EP | 1112008 B1 | 4/2001 |
| EP | 1219184 A2 | 3/2002 |
| EP | 1295537 A2 | 3/2003 |
| JP | 5227925 A | 9/1993 |
| JP | 6153880 A | 6/1994 |
| JP | 6311875 A | 11/1994 |
| JP | 20021913344 A | 7/2002 |
| WO | 9721361 A1 | 6/1997 |
| WO | 9929187 A1 | 6/1999 |
| WO | 0015053 A1 | 3/2000 |

OTHER PUBLICATIONS

D. Margosch et al., "Comparison of Pressure and Heat Resistance of *Clostridium botulinum* and Other Endospores in Mashed Carrots," Journal of Food Protection (US), 2004, 67 (11) p. 2530-7 (abstract, 1 page).

N.R. Reddy et al., "Inactivation of *Clostridium botulinum* Type A Spores by High-Pressure Processing at Elevated Temperatures," Journal of Food Protection (US), 2006, 66 (8) p. 1402-7 (abstract, 1 page).

S. Gola et al., "Resistance to High Hydrostatic Pressure of Some Strains of *Clostridium botulinumin* Phosphate Buffer," Industria Conserve, 2005, 80 (2) p. 149-157 (abstract, 1 page).

A.C. Rodriguez et al., "Model of the Inactivation of Bacterial Spores by Moist Heat and High Pressure," Journal of Food Science, 2004, 69 (8) E367-E373 (abstract, 1 page).

C.E. Sizer et al., "Validating High-Pressure Processes for Low-Acid Foods," Food Technology, 2002, 56 (2) 36, p. 38-42 (abstract, 1 page).

V.K. Juneja et al., "Control of Foodborne Microorganisms," FSTA IFIS Publishing, 2001 (abstract, 1 page).

N.R. Reddy et al., "Inactivation of *Clostridium botulinum* Type E Spores by High Pressure Processing," Journal of Food Safety, 1999, 19 (4) 277-288 (abstract, 1 page).

A. Martinez et al., "Minimal Thermal Processes for Fruit and Vegetables," European Food & Drink Review, 1997, Autumn, 39, 41-41 (abstract, 1 page).

M. Griffiths, "Understanding Pathogen Behaviour: Virulence, Stress Response and Resistance," Woodland Publishing Ltd., Cambridge 2005 (abstract, 1 page).

Y-C Su et al., "Microbiology and Pasteurization of Surimi Seafood," CRC Press, Boca Raton, 2005, 2nd Edition (abstract, 1 page).

Unknown Author, "Advances in Nonthermal Food Processing Technologies," Food Technology Intelligence Incorporated, FTI Inc., Midland Park, Food Processing and Biotechnology, 2001 (abstract, 1 page).

Unknown Author, "Advances in Nonthermal Food Processing Technologies," Food Technology Intelligence Incorporated, FTI, Inc., Midland Park, 2001 (abstract, 1 page).

B. Brooker, "Ultra-High Pressure Processing," Food Technology International, 1999, 59+61-62, Sterling Publications Limited (abstract, 1 page).

K.T. Higgins, "Asepsis Reconsidered," Food Engineering, Apr. 2000, 72 (4), 113-116+118 (abstract, 1 page).

C. Beveridge, "Safety First. (Controlling Pathogenic Organisms in the Potato Industry)," Potato Business World, Nov.-Dec. 1999, 7 (6), 25-30 (abstract, 1 page).

T. Ohlsson, "Advances in Pasteurisation and Sterilisation Technologies," European Food and Drink Review 1995 (Summer), 19-25 (abstract, 1 page).

Anon, "Combine High Pressure and Heat Treatments to Inactivate Spores," Microbial Update International, 1996, 1 (6), 6-7 (abstract, 1 page).

P. Rovere et al., "High-Pressure Treatments: Evaluation of the Sterilization Effect and of Thermal Damage," Industria Conserve (Oct.-Dec.) 1996, 71 (4), 473-483 (abstract, 1 page).

K. Kimura et al., "Application of High Pressure for Sterilization of Low Acid Food," High Pressure Bioscience and Biotechnology: Proceedings of an International Conference, Kyoto, Nov. 1995, 429-432 (abstract, 1 page).

C.E. Morris, "High Pressure Builds Up," Food Engineering, 1993, 65 (10), 113-120 (abstract, 1 page).

G. Bodt et al., "Contamination of Honeys by Endospores. Possibilities of Sterilization and Trials with High Pressure Treatment," Carnet du Cari, 1996, (52): p. 16-19 (abstract, 1 page).

S-Y Lee, "Inhibitory Effects of High Pressure and Heat on *Alicyclobacillus acidoterrestris* Spores in Apple Juice," Applied and Environmental Microbiology, Aug. 2002, vol. 68, No. 8, p. 4158-61 (4 pages).

M.F. Patterson, "A REVIEW: Microbiology of Pressure-Treated Foods," Journal of Applied Microbiology, 2005, 98, 1400-09 (10 pages).

D. Margosch et al., "High-Pressure-Mediated Survival of *Clostridium botulinum* and *Bacillus amyloliquefaciens* Endospores at High Temperature," Applied and Environmental Microbiology, May 2006, vol. 72, No. 5, p. 3476-3481 (6 pages).

D. Margosch, "Behaviour of Bacterial Endospores and Toxins as Safety Determinants in Low Acid Pressurized Food," Doctoral Thesis, Technische Universitat Munchen, 2004 (115 pages).

Reddy, N.R. et al., "Inactivation of *Clostridium botulinum* Type E Spores by High Pressure Processing." Journal of Food Safety, Dec. 1999, 277-288, vol. 19, Issue 4.

Canadian Intellectual Property Office, Office Action in the Canadian counterpart of the instant U.S. application, CA application No. 2,665,705; Aug. 13, 2014 (2 pages).

Claims rejected by Aug. 13, 2014 office action in CA application 2,665,705. (5 pages).

\* cited by examiner

Figure 3a: Red Onion
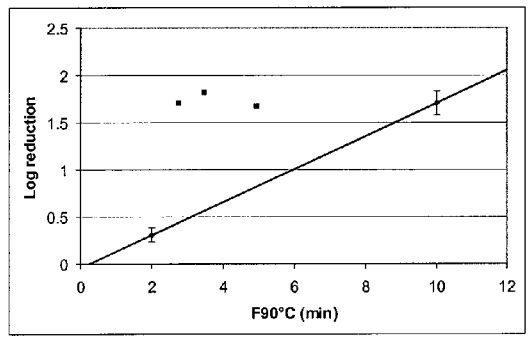
Figure 3b: Cauliflower
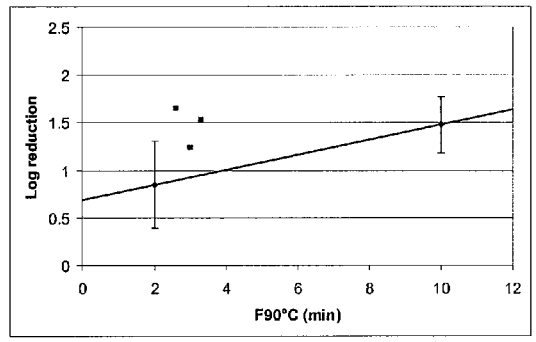
Figure 3c: Carrot
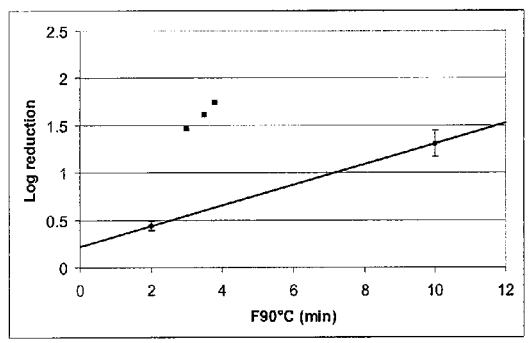
Figure 3d: Peas
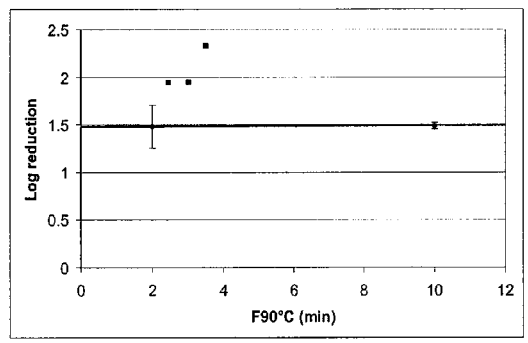

Figure 3e: TPYG media
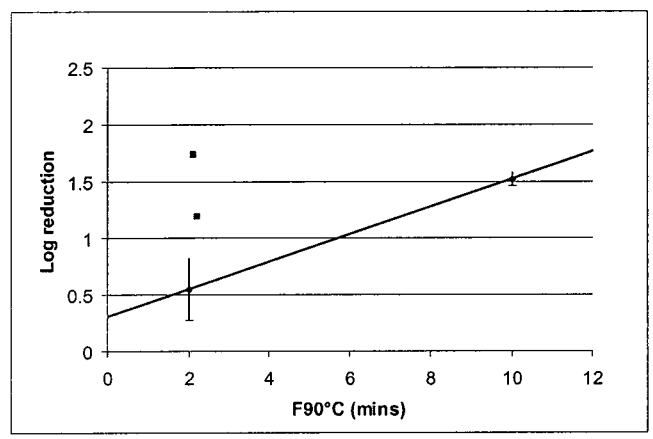

PROCESS FOR REDUCING SPORE LEVELS IN COMPOSITIONS

FIELD OF THE INVENTION

The present invention relates to a process effective for reducing the number of spores, especially psychrotrophic spores, in compositions. More specifically, a method is provided for heating a composition at a temperature, pressure and for a time effective for reducing the number of psychrotrophic spores in the composition by at least about 3 logs. In one important aspect, the invention relates to producing vacuum packed or modified atmosphere packed chilled food products.

BACKGROUND OF THE INVENTION

Vacuum packed (VP) and modified atmosphere packed (MAP) chilled food products generally have the following common characteristics:
- they tend to be subjected to minimal heat treatment or pasteurisation to reduce the microbial population in the product. This is not the same as sterilisation. Sterilisation essentially annihilates all micro-organisms in a product;
- they are generally vacuum packed or otherwise flushed with an inert gas to completely or partially remove oxygen. This is done to prevent growth of aerobic organisms that are not affected by the pasteurisation;
- they are generally stored, delivered and sold under refrigeration conditions (from 0 to 10° C.) to prevent spoilage by mesophilic organisms not affected by the pasteurisation.

As a consequence of the above processing, VP/MAP products tend to have a shelf life of about 10 days. After this point they succumb to microbial spoilage and have the potential to become unsafe because, as noted above, they are not completely sterilised by the pasteurisation process.

VP/MAP foods tend to have enhanced organoleptic properties and nutritional qualities. This is a key benefit of these foods and it is realised because the foods are pasteurised and not sterilised. More aggressive anti-microbial treatments, such as sterilisation tend to destroy organoleptic properties and nutritional qualities. However, there is one problem that is particular to VP/MAP foods. This is that the anaerobic conditions and refrigeration conditions that are required to prevent spoilage by anaerobic mesophilic organisms still permit germination of psychrotrophic spores of anaerobic bacteria and toxin production therefrom. These spores tend to be ubiquitous in nature and hence can readily contaminate food during manufacture. They also tend to be heat resistant and hence are not readily affected by the pasteurisation treatments applied to VP/MAP foods that allow the enhanced organoleptic properties and nutritional qualities of these foods to be realised.

One example of these spores is the spore of non-proteolytic *Clostridium botulinum* type E. These spores can germinate and produce toxin at temperatures greater than 3.3° C. i.e. within the range of refrigeration conditions noted above.

This problem is further compounded by the fact that VP/MAP food products are intended to have a shelf-life of up to and beyond 10 days. More specifically, each day that the product is stored in refrigeration conditions increases the likelihood of there being outgrowth of and toxin production by a psychrotrophic spore.

There are a number of ways of minimising the risk of germination of psychrotrophic spores. The regulatory authorities of many countries including the UK and the US require the VP/MAP food product to be subjected to either:
(i) a process wherein the product is exposed to temperatures of 90° C. for 10 minutes; or
(ii) a process of "equivalent lethality"—i.e. a process that provides for the destruction of the same number of psychrotrophic spores in the product as that of exposing the product to 90° C. for 10 minutes.

At the time of the invention, it was generally understood that to be considered a process of "equivalent lethality", the process must provide for a 6-log reduction in numbers of Type E spores (see: Draft Guidance on the safety and shelf-life of vacuum and modified atmosphere packed chilled foods, UK Food Standards Agency, 2004) US. Food & Drug Administration Center for Food Safety & Applied Nutrition FISH AND FISHERIES PRODUCTS HAZARDS AND CONTROLS GUIDANCE Third Edition June 2001, chapter 17). At this time it was understood that this level of spore reduction would invariably require a process including a heat treatment step of greater than 80° C. Further such heat treatment was generally understood as tending to result in loss of organoleptic properties and nutritional quality of foods.

Where such a heat treatment is not applied (for example, because of concern of loss of organoleptic properties and nutritional quality), a milder heat treatment step (for example less than 80° C.) tends to be used and combined with a further step of adjusting salt, acidity and/or water activity, or adding preservatives such as nitrite. Clearly, these adjustments may also affect the organoleptic properties and nutritional quality of VP/MAP food products.

There is a need for a process for pasteurisation and production of VP/MAP food products that achieves a destruction of spores, especially non-proteolytic *C. botulinum* type E spores, that is equivalent to that achieved by heating the product at 90° C. for 10 minutes and that, in particular, does not substantially affect the organoleptic properties or nutritional quality of the food product.

SUMMARY OF INVENTION

The inventors have surprisingly found that when certain psychrotrophic spores are heated at 90° C. for 10 minutes, the reduction in spore number is substantially less than a 6 log reduction. In particular, as described in the Examples, the inventors have found that the greatest reduction in spore number that can be achieved is a 3 to 3.5 log reduction. As noted above, this was unanticipated at the time of the invention.

In view of the above, the inventors have recognised that a process of equivalent lethality to heating at 90° C. for 10 minutes is one that merely provides for a 3 to 3.5 log reduction in spore numbers when measured using the same reference spores. The inventors have found that this can be achieved by minimal heat treatment involving heating a VP/MAP product and holding the heated product at a pressure for a period of time that is capable of giving a 3 to 3.5 log reduction of psychrotrophic spores such as Type E spores.

Advantageously, depending on the pressure and pressure holding time, the temperature required for this purpose may be much lower than that that would otherwise be required for a process of equivalent lethality to a 90° C. for 10 minutes heat treatment. Accordingly, the inventors have determined a process that requires minimal heat treatment for pasteurisation and production of a VP/MAP food product.

A further advantage is that the process does not require pH, salt, preservative or water activity adjustments.

Thus in one aspect there is provided a process for pasteurising a VP/MAP food product. The process includes a step of heating a VP/MAP food product and subjecting the heated product to pressure conditions to cause about a 3.5 log reduction of a psychrotrophic spore in the food product.

In another aspect there is provided a process for extending the shelf-life of a VP/MAP food product including heating a VP/MAP food product and subjecting the heated product to pressure conditions to cause about a 3.5 log reduction of a psychrotrophic spore in the food product.

In another aspect there is provided a process for the production of a VP/MAP food product including heating a VP/MAP food product and subjecting the heated product to pressure conditions to cause about a 3.5 log reduction of a psychrotrophic spore in the food product.

In a further embodiment there is provided a process for inactivating a psychrotrophic spore in a VP/MAP food product including heating a VP/MAP food product and subjecting the heated product to pressure conditions to cause about a 3.5 log reduction of a psychrotrophic spore in the food product.

In still further embodiments there is provided a process for limiting the germination of psychrotrophic spores in a VP/MAP food product during the shelf-life of the product including heating a VP/MAP food product and subjecting the heated product to pressure conditions to cause about a 3.5 log reduction of a psychrotrophic spore in the food product.

In still further embodiments there is provided, in a process for production of a VP/MAP food product, a pasteurisation step having a lethality for *C. botulinum* type E spores that is equivalent to a heat treatment of 90° C. for 10 minutes, the process including the step of heating a VP/MAP food product and subjecting the heated product to pressure conditions to cause a 3.5 log reduction of psychrotrophic spores in the food product.

In other embodiments, there is provided a VP/MAP food product produced by a process described above.

BRIEF DESCRIPTION OF THE FIGURES

FIG. 3 is a comparison of inactivation of *C. botulinum* Type E 'Nanaimo' in vegetable purees and in TYPG media.

DETAILED DESCRIPTION OF THE EMBODIMENTS

Figure 1:
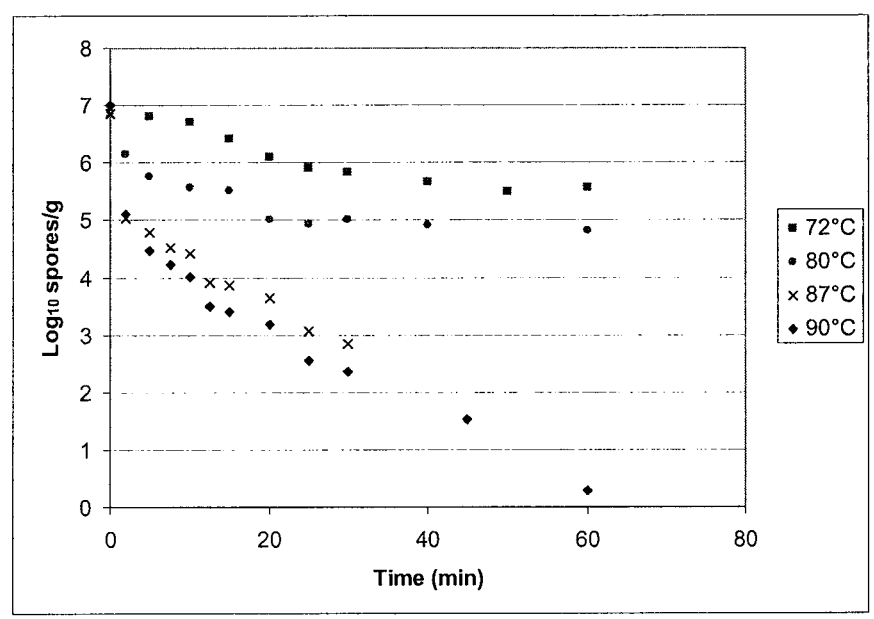
FIG. 1 illustrates inactivation of *Clostridium botulinum* Type E 'Nanaimo' under isothermal treatment conditions of 72, 80, 87 and 90° C.

In certain embodiments there is provided a process for pasteurising a VP/MAP food product including heating a VP/MAP food product and subjecting the heated product to pressure conditions to cause about a 3 log reduction in the number of psychrotrophic spores in the food product.

VP (vacuum packed) and MAP (modified atmosphere packed) food products are known in the art. (See: Guidance on the safety and shelf-life of vacuum and modified atmosphere packed chilled foods, UK Food Standards Agency, 2004).

These food products may also be referred to as "minimally processed refrigerated foods", "new generation refrigerated foods", "chilled foods", "extended shelf life refrigerated foods", "sous-vide" or "refrigerated pasteurised foods of extended durability" (REPFEDS).

As noted above, these food products are distinguished from other products by their preparation. They are typically prepared by vacuum packing fresh or freshly prepared foods, or by flushing these foods with an inert gas to partially or completely deplete oxygen.

VP/MAP foods tend to have enhanced organoleptic properties and nutritional quality. These beneficial characteristics tend to be a consequence of the minimal processing of raw materials from which the products are derived and from mild to moderate pasteurisation.

Typically, VP/MAP foods may be produced from raw materials including dairy, meat, seafood, egg, fruit and vegetable.

A particular subset of VP/MAP foods, more specifically, those having a pH of about 5 or more are of particular interest as these foods tend to be more likely to suffer from a problem that is present in VP/MAP chilled food products: germination of psychrotrophic bacterial spores and toxin production therefrom.

As discussed herein and exemplified in the Examples, the measure of reduction in the number of psychrotrophic spores in the food product as a consequence of heating and pressure treatment according to the invention can be determined by use of a control containing a known amount of psychrotrophic spores during the heat and pressure treatment step. Typically these spores are non-proteolytic *C. botulinum* spores, such as Type E spores.

In certain embodiments, the VP/MAP food product is heated and subjected to pressure conditions to cause about a 4 log reduction in the number of psychrotrophic spores in the food product. Lesser reduction of psychrotrophic spores may be appropriate where the food product has particularly delicate organoleptic properties, and/or where salt or acid conventionally forms part of the flavour profile of the food product. For example, the VP/MAP food product may be heated and subjected to pressure conditions to cause at least a 1 log reduction in the number of psychrotrophic spores in the food product. In other embodiments, the VP/MAP food product is heated and subjected to pressure conditions to cause about a 2, 2.5, 3.0, 3.5, 4.0, 4.5, 5.0, 5.5, 6.0 or greater log reduction in the number of psychrotrophic spores in the food product.

The temperature and pressure treatments required to obtain these measures of reduction of psychrotrophic spores are discussed below and further exemplified in the Examples.

Generally the food product is heated to a temperature of less than about 88° C. and more than about 55° C. A particularly useful range is between 57.5° C. and 87.5° C., preferably between about 57.5° C. and 72.5° C., and more preferably between about 65° C. and 72.5° C.

In certain embodiments, the food product is subjected to pressure conditions of less than about 850 MPa and more than about 450 MPa. Suitable ranges of pressure conditions include between 450 MPa and 820 MPa, preferably between 450 MPa and 700 MPa, more preferably between 450 MPa and 650 MPa, more preferably between 500 MPa and 650 MPa and more preferably between 550 MPa and 650 MPa.

The pressure hold time: i.e. the time at which the food product is held at the selected pressure is relevant to the reduction of psychrotropic spores that can be achieved. Typically, the food product is subjected to pressure conditions for a time of about 10 minutes or less, and more than about 2 minutes.

The inventors have found that the key factors controlling reduction of spores tend to be the temperature applied to heat the sample prior to pressurising it and the pressure conditions i.e. amount of pressure and pressure hold time. As discussed herein, the appropriate temperature tends to be dependent on the pressure conditions applied to the food product. In certain embodiments, a higher treatment temperature requires a lower pressure treatment and pressure holding time, whereas low treatment temperature requires a high pressure treatment and pressure holding time.

Importantly, the inventors have found that salt addition appears to have little effect on the capacity of heating and pressure treatments to destroy psychrotropic spores. However, in certain embodiments, particularly where the pressure and heat treatments are relatively low, it is recognised that salt content of the food product may be adjusted by adding salt to it. Additionally or alternatively, these embodiments may include the further step of adjusting the water activity of the food product, or of adding a preservative to the food product such as a nitrite.

Surprisingly, as shown in the Examples, the inventors have found that low pH, high acid, environments tend to make it more difficult to reduce the number of psychrotropic spores. This is something that was unanticipated at the time of the invention. Accordingly, one embodiment includes the further step of adjusting the pH of the food product, for example by increasing the pH of the food product to about pH 5 or more. This pH adjustment may occur prior to subjecting the food product to pressure conditions.

It will be understood that a "VP/MAP food product" refers to a product that may or may not be chilled, although typically, in commercial use, these food products are stored, distributed and sold under refrigeration conditions.

In certain embodiments, the process of pasteurising a VP/MAP food product described herein includes the further steps of returning the food product to atmospheric pressure and cooling the food product to prevent growth of mesophilic micro-organisms in the food product. These temperatures are typically refrigeration temperatures, i.e. temperatures in the range of from 0 to 10° C.

EXAMPLES

Example 1

Heat Resistance Determination

Methods:
The heat only resistance of *C. botulinum* 'Nanaimo' was determined under four isothermal treatments of 72, 80, 87 and 90° C.
Results and Discussion
The heat only resistance of *C. botulinum* 'Nanaimo' at 72, 80, 87 and 90° C. is shown in FIG. 1. The results of the heat only inactivation of 'Nanaimo' were compared with those reported for a Type E strain of non-proteolytic *C. botulinum*, ATCC 9564, and for a Type B strain of non-proteolytic *C. botulinum*, ATCC 25765, by Gaze and Brown (1990), and subsequently used to set the industry standard guidelines for the inactivation of non-proteolytic *C. botulinum* (Anon, 1992). For *C. botulinum* ATCC 9564, Gaze and Brown (1990) reported D90° C.=0.48 min in a carrot homogenate (pH 5.7) and D90° C.=0.79 min in a cod homogenate (pH 6.8). For *C. botulinum* ATCC 25765, Gaze and Brown (1990) reported D90° C.=0.43 min in carrot and D90° C.=1.1 min in cod homogenate. Basing their calculations on a worse-case scenario, Gaze and Brown (1990) recommended a thermal process equivalent to at least to 7 min at 90° C. in order to inactivate 6 log spores (D90° C.=1.1 min×6=6.6 min, rounded to 7 min). Gaze and Brown's (1990) recommendations have since been translated into industry guidelines and code of practice (e.g. Anon, 1992), specifying a thermal process equivalent to 10 min at 90° C. for the inactivation of 6 log spores of non-proteolytic *C. botulinum*. In comparison, for *C. botulinum* 'Nanaimo', our results show only a 3 log reduction of spores of 'Nanaimo' after 10 min at 90° C., with a 6 log reduction achieved only after 45-60 min at 90° C.

Example 2

Inactivation of *C. botulinum* by Heat and Pressure

Methods:
Heat and high pressure resistance of *C. botulinum* 'Nanaimo' was determined in tryptone peptone glucose yeast extract agar (TPGYA), with different concentrations of salt and at different pH, as a first step in determining the effect of these variables on inactivation. A full factorial matrix of 2× pressure, 2× temperature, 2× pH and 2× salt was employed as the base of the experiment design (Table 1), giving 16 combinations in total (Table 1; Treatment #1-16). In addition, a further 8 treatments were selected to test the response of the organism to extremes of pressure, temperature, pH and salt (Table 1; Treatment #17-24). Finally, triplicate treatments testing the response to the average central value of each factor (Table 1; Treatment #25-27) were included. At least two and up to four pressure-hold times between 1 and 60 min were tested for each treatment.

A separate cryovial of spore crop was defrosted on each day that experimental work was conducted, diluted ¼ in MPA broth and stored on ice. For each sample, the appropriate TPGYA base (1.8 mL) was dispensed into stainless steel sample tubes and kept at 50° C. in a waterbath until required (less than 20 min). Tubes were inoculated with 200 µL diluted spore crop immediately prior to use, to give an initial concentration of $10^7$ spores/mL. A control (uninoculated) stainless steel tube, containing 2 mL of the appropriate TPGYA base, was fitted with a triple thermocouple, and used to monitor and record the heating and cooling profile of the matched inoculated sample during each high pressure run. Immediately after inoculation of the sample tube, both the (closed) sample tube and the triple thermocouple-fitted tube were placed in a salted ice-water slurry. The temperature was monitored until 2° C. was achieved in the centre of the uninoculated sample (as measured by the middle thermocouple), at which time the sample and the triple thermocouple were simultaneously transferred to individual pressure vessels in the kinetics unit, the top-plugs screwed into the pressure vessels and compression of the samples commenced. Upon obtaining the designated pressure, timing was commenced, and depressurisation initiated after the appropriate pressure-hold time. Samples were removed from the unit as quickly as possible following depressurisation, and cooled briefly in the ice-water slurry before sampling.

Enumeration of samples after treatment was carried out by transferring 1 mL of the treated sample into 9 mL modified PA3679 (MPA) broth, from which serial dilutions (in MPA) were prepared. Survivors were enumerated by pour plating with ESA, with an ESA overlay. All plates were incubated at 30° C. in an anaerobic cabinet for 5-7 days before counting. Inactivation counts were compared with an inoculum count prepared by heating a ¹⁄₁₀₀ dilution of spore crop at 60° C. for 15 mins in MPA broth (pre-equilibrated to 60° C.); enumeration was carried out as described for the heat treated samples.

TABLE 1

Matrix of treatments used to determine the resistance of
Clostridium botulinum 'Nanaimo' to high pressure and heat at different
concentrations of salt, and at different pH values

| Treatment # | Pressure (MPa) | Temperature (° C.) | pH | Salt % w/v |
|---|---|---|---|---|
| 1 | 500 | 65 | 5.6 | 0.975 |
| 2 | 600 | 65 | 5.6 | 0.975 |
| 3 | 500 | 80 | 5.6 | 0.975 |
| 4 | 600 | 80 | 5.6 | 0.975 |
| 5 | 500 | 65 | 6.4 | 0.975 |
| 6 | 600 | 65 | 6.4 | 0.975 |
| 7 | 500 | 80 | 6.4 | 0.975 |
| 8 | 600 | 80 | 6.4 | 0.975 |
| 9 | 500 | 65 | 5.6 | 2.525 |
| 10 | 600 | 65 | 5.6 | 2.525 |
| 11 | 500 | 80 | 5.6 | 2.525 |
| 12 | 600 | 80 | 5.6 | 2.525 |
| 13 | 500 | 65 | 6.4 | 2.525 |
| 14 | 600 | 65 | 6.4 | 2.525 |
| 15 | 500 | 80 | 6.4 | 2.525 |
| 16 | 600 | 80 | 6.4 | 2.525 |
| 17 | 450 | 72.5 | 6 | 1.75 |
| 18 | 650 | 72.5 | 6 | 1.75 |
| 19 | 550 | 57.5 | 6 | 1.75 |
| 20 | 550 | 87.5 | 6 | 1.75 |
| 21 | 550 | 72.5 | 5.2 | 1.75 |
| 22 | 550 | 72.5 | 6.8 | 1.75 |
| 23 | 550 | 72.5 | 6 | 0.2 |
| 24 | 550 | 72.5 | 6 | 3.3 |
| 25 | 550 | 72.5 | 6 | 1.75 |
| 26 | 550 | 72.5 | 6 | 1.75 |
| 27 | 550 | 72.5 | 6 | 1.75 |

Data from the triple thermocouple was used to calculate $F_{90°\ C.}$ (i.e. thermal equivalence, in min, to an isothermal process at 90° C.) values from each run, including the initial cooling of the sample, the pressure treatment, sample removal and final cooling stages. $F_{90°\ C.}$ values were calculated using the Trapezoidal Integration Method based on the thermal profile of the thermocouple in the centre of the sample, which consistently gave the highest F value due to the centre of the sample being the slowest to heat and also the slowest to cool. The z-value was assumed to be 10° C. for all calculations, rounded from the worst-case z-value for heat only inactivation of 9.84° C. reported by Gaze and Brown (1990) for non-proteolytic C. botulinum ATCC 9564 (Type E) in carrot homogenate.

Figure 2:
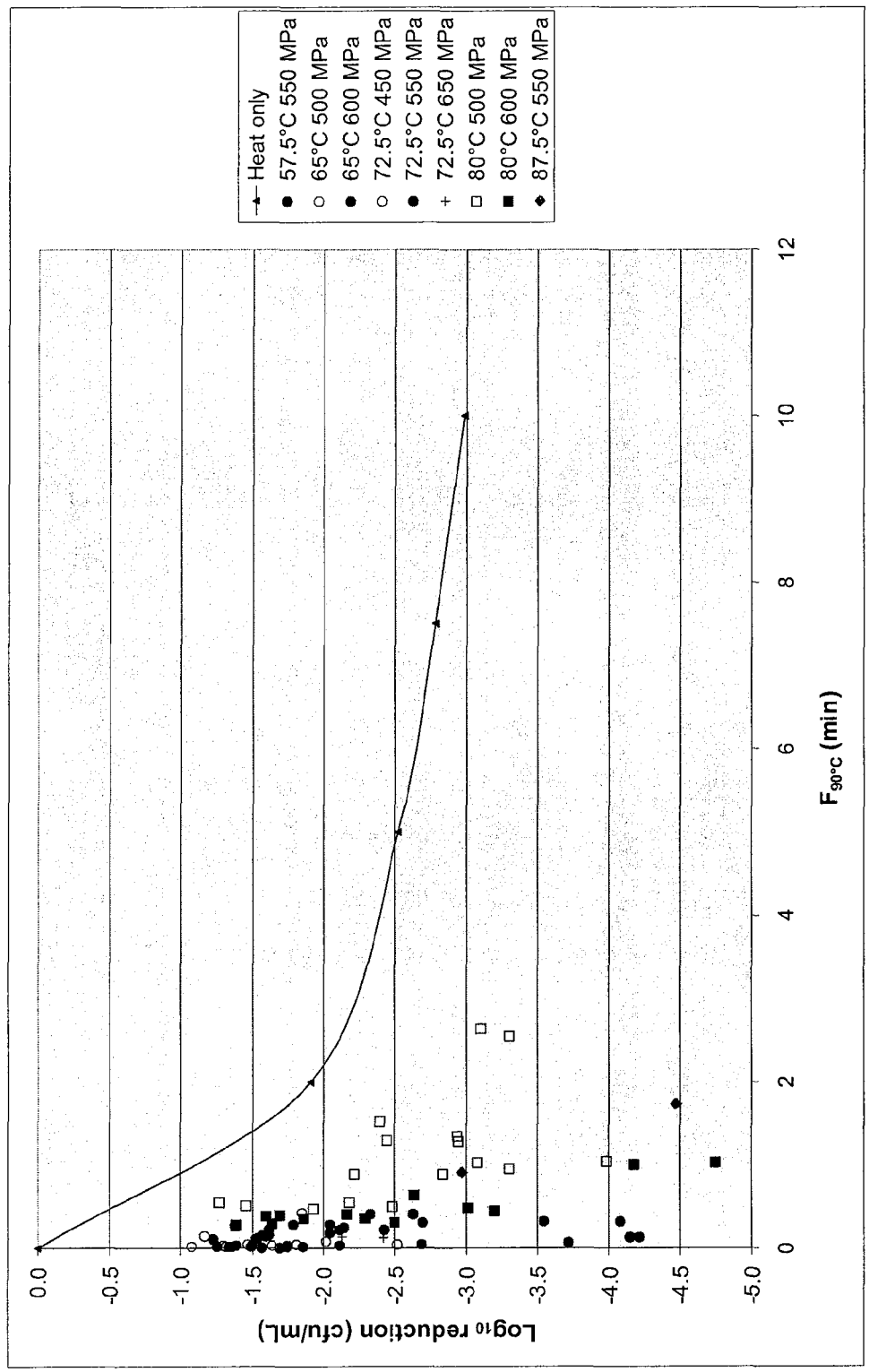
FIG. 2 is a comparison of inactivation of *Clostridium botulinum* Type E 'Nanaimo' by combined high pressure and heat treatments (with different pH and salt concentrations) with heat only (90° C.).
Figure 4:
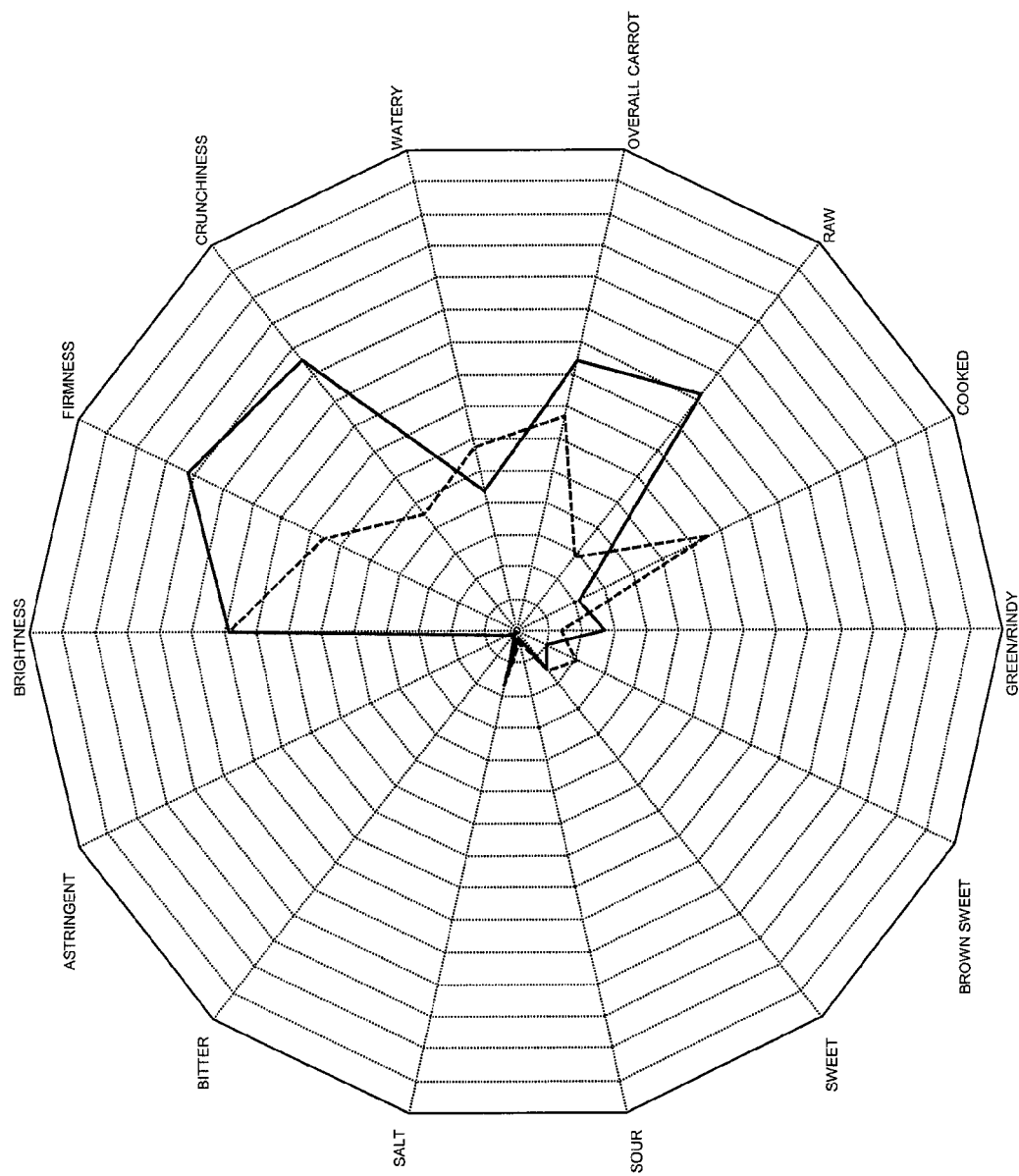
FIG. 4 is a plot of result of sensory evaluations of carrots treated with heat alone (dashed lines) vs. treated with heat and pressure (solid lines).
Figure 5:
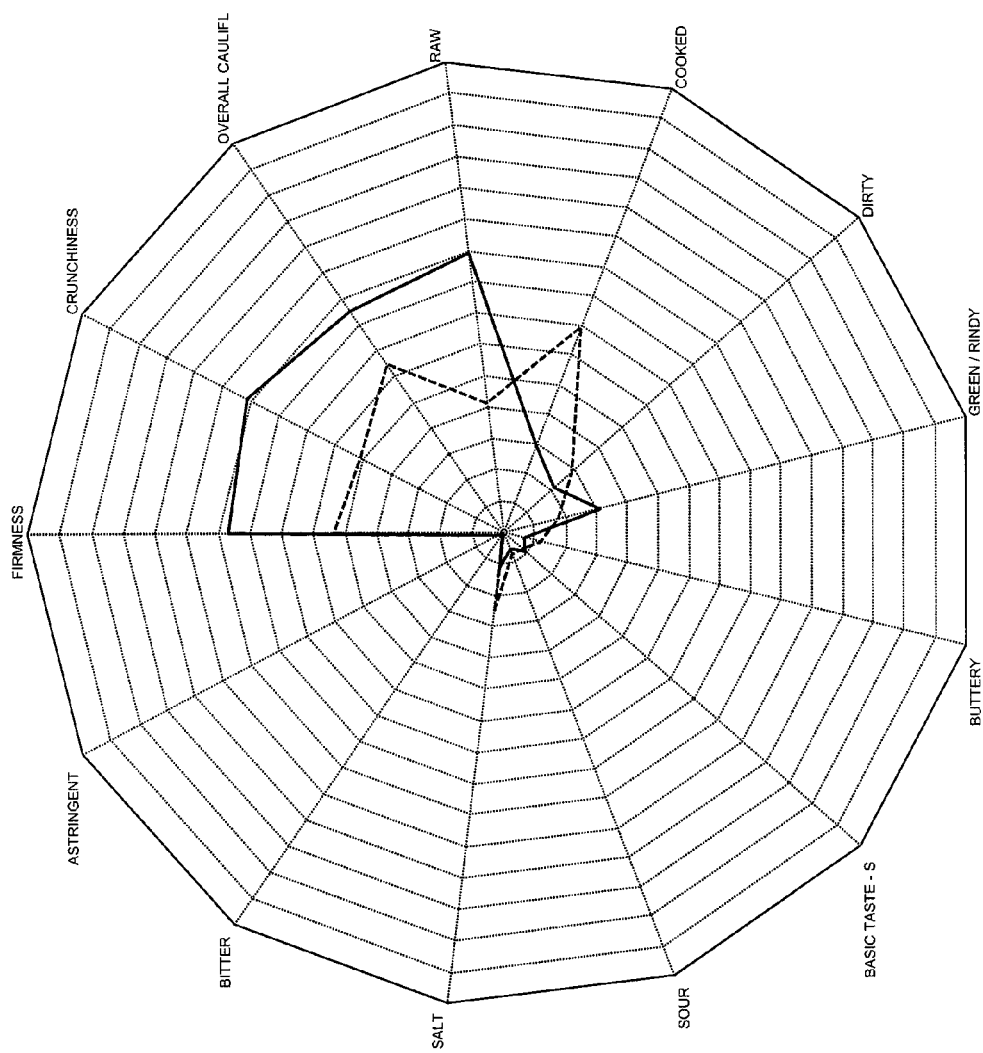
FIG. 5 is a plot of result of sensory evaluations of cauliflower treated with heat alone (dashed lines) vs. treated with heat and pressure (solid lines).
Figure 6:
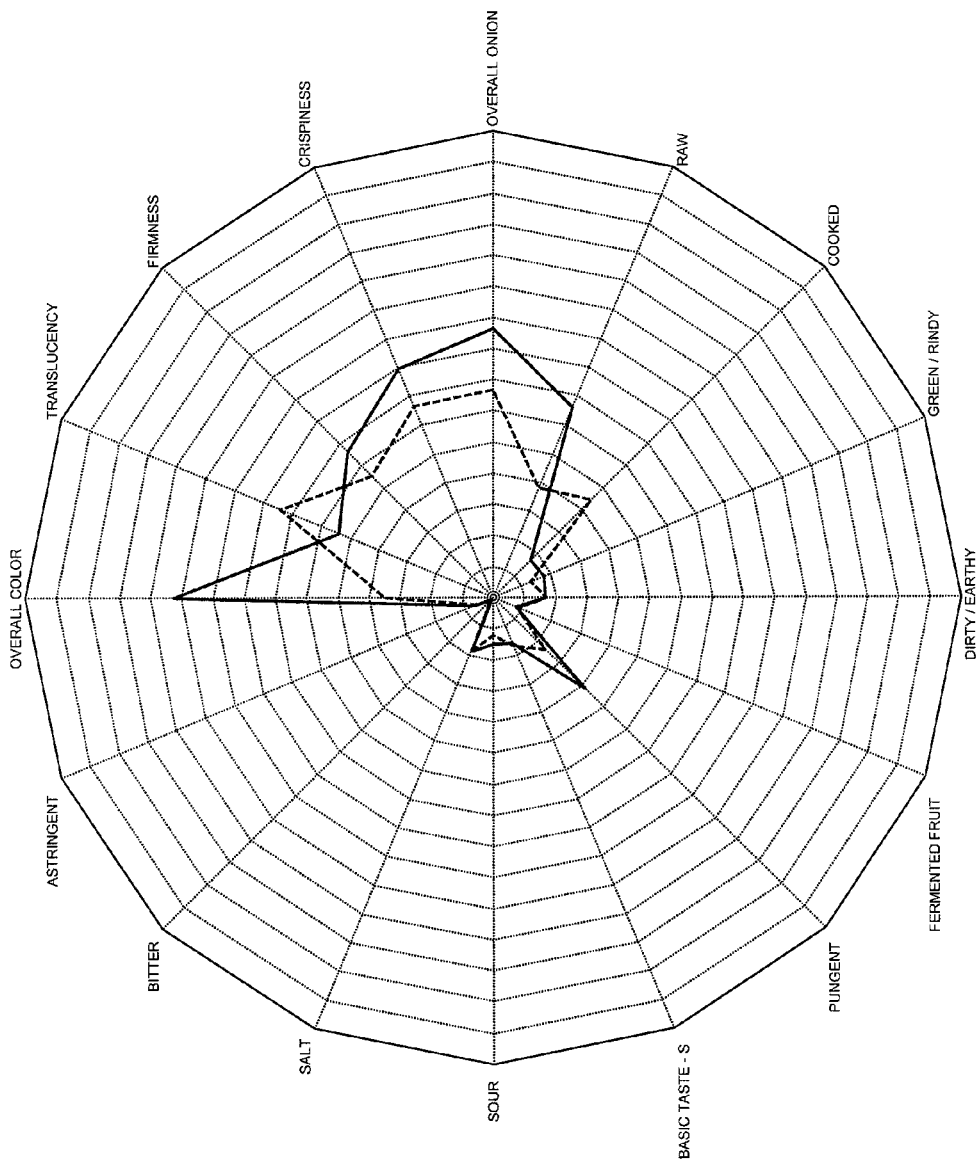
FIG. 6 is a plot of result of sensory evaluations of red onions treated with heat alone (dashed lines) vs. treated with heat and pressure (solid lines).
Figure 7:
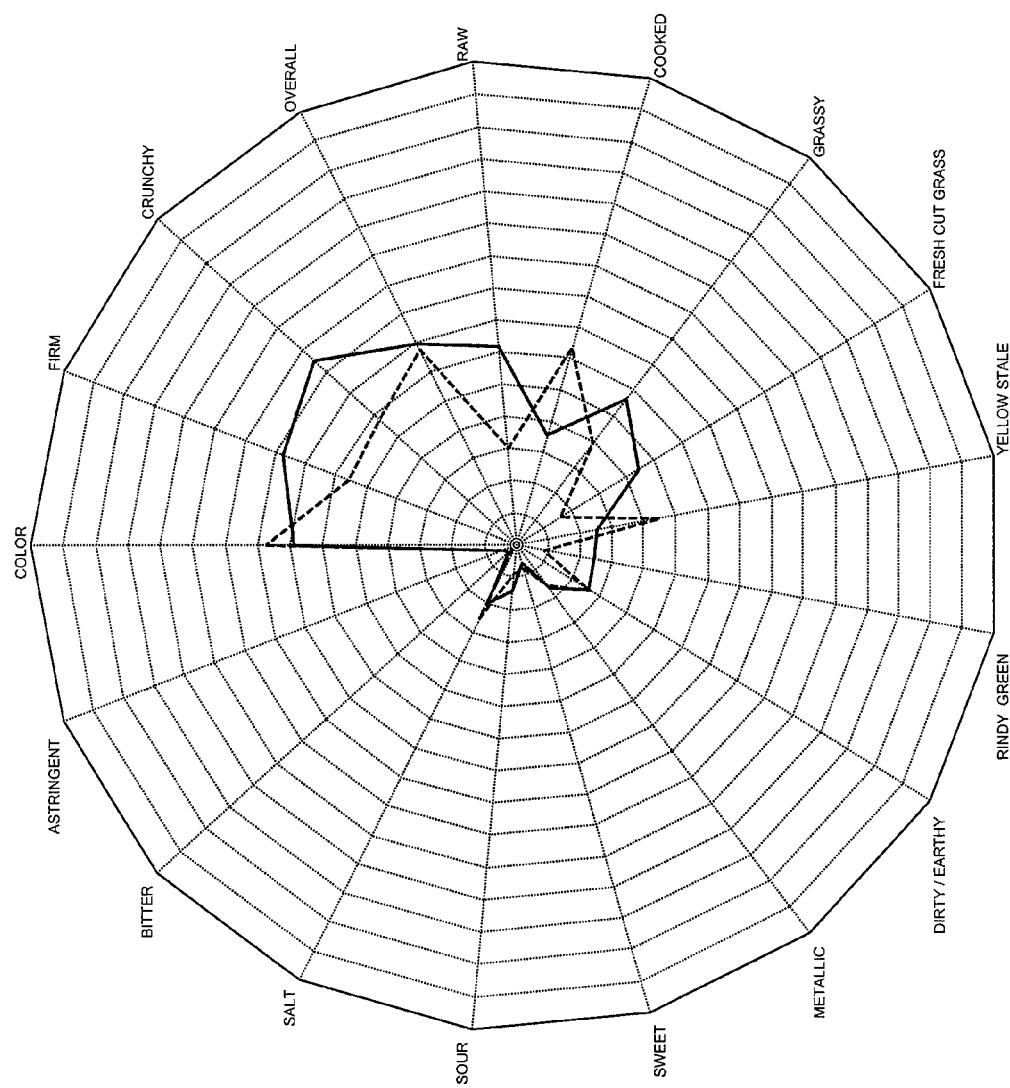
FIG. 7 is a plot of result of sensory evaluations of snap peas treated with heat alone (dashed lines) vs. treated with heat and pressure (solid lines).
Figure 8:
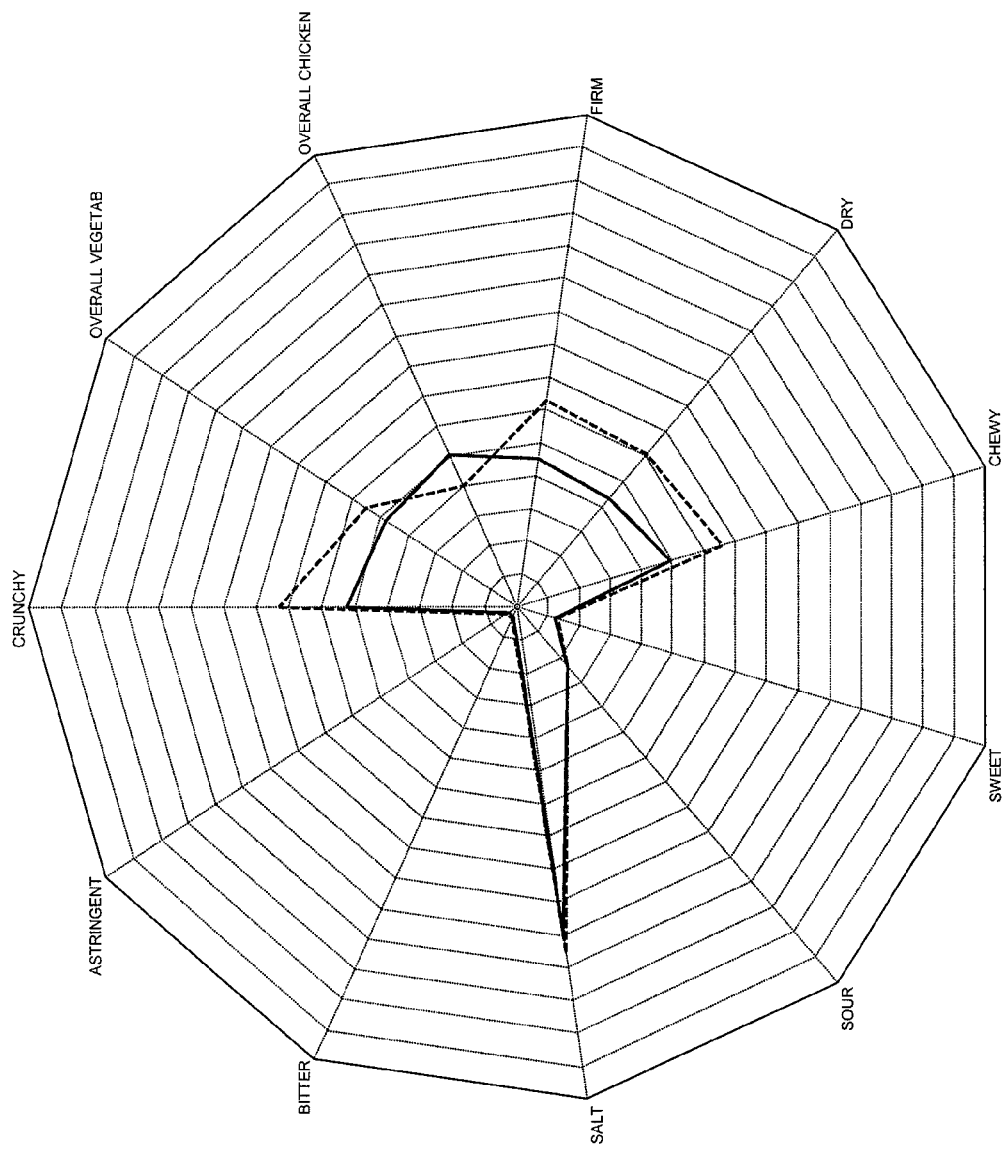
FIG. 8 is a plot of result of sensory evaluations of stir fry treated with heat alone (dashed lines) vs. treated with heat and pressure (solid lines).

Results:

Results for the inactivation of C. botulinum 'Nanaimo' by high pressure and heat at different concentrations of salt, and at different pH values are given for the various pressure-hold times investigated (Table 2). Inactivation of C. botulinum 'Nanaimo' using combined high pressure and heat was generally found to approximate logarithmic decline initially, but continued processing (i.e. longer hold times) often resulted in a decrease in the $\log_{10}$ reduction per $F_{90°\ C.}$ min. For all combined heat and high pressure treatments, inactivation was greater than for a thermally equivalent heat only treatment (FIG. 2).

TABLE 2

Inactivation of Clostridium botulinum 'Nanaimo' by high pressure and heat at different
concentrations of salt, and at different pH values

| Treatment # | Pressure (MPa) | Temp (° C.) | pH | Salt (% w/v) | Pressure-hold time (min) | $F_{90°\ C.}$ at middle (min) | Log reduction for process | Log reduction per $F_{90°\ C.}$ min |
|---|---|---|---|---|---|---|---|---|
| 1 | 500 | 65 | 5.6 | 0.975 | 8 | 0.026 | 1.50 | 57.57 |
|  |  |  |  |  | 16 | 0.047 | 1.47 | 31.27 |
| 2 | 600 | 65 | 5.6 | 0.975 | 5 | 0.023 | 1.26 | 54.73 |
|  |  |  |  |  | 10 | 0.035 | 1.39 | 39.71 |
|  |  |  |  |  | 60 | 0.138 | 4.21 | 30.54 |
| 3 | 500 | 80 | 5.6 | 0.975 | 5 | 0.523 | 1.45 | 2.78 |
|  |  |  |  |  | 10 | 0.895 | 2.84 | 3.18 |
|  |  |  |  |  | 18 | 1.300 | 2.45 | 1.88 |
|  |  |  |  |  | 40 | 2.646 | 3.10 | 1.17 |
| 4 | 600 | 80 | 5.6 | 0.975 | 1 | 0.281 | 1.39 | 4.96 |
|  |  |  |  |  | 3 | 0.460 | 3.21 | 6.97 |
| 5 | 500 | 65 | 6.4 | 0.975 | 8 | 0.033 | 1.64 | 49.76 |
|  |  |  |  |  | 12 | 0.047 | 1.82 | 38.63 |
| 6 | 600 | 65 | 6.4 | 0.975 | 5 | 0.023 | 1.34 | 58.28 |
|  |  |  |  |  | 10 | 0.038 | 1.74 | 45.89 |
|  |  |  |  |  | 60 | 0.139 | 4.15 | 29.86 |
| 7 | 500 | 80 | 6.4 | 0.975 | 5 | 0.563 | 2.18 | 3.87 |
|  |  |  |  |  | 10 | 1.047 | 3.98 | 3.81 |
| 7 repeat | 500 | 80 | 6.4 | 0.975 | 5 | 0.486 | 1.93 | 3.97 |
|  |  |  |  |  | 10 | 0.956 | 3.30 | 3.45 |
| 8 | 600 | 80 | 6.4 | 0.975 | 1 | 0.300 | 1.64 | 5.46 |
|  |  |  |  |  | 3 | 0.65 | 2.64 | 4.07 |
|  |  |  |  |  | 5 | 0.322 | 2.50 | 7.76 |
|  |  |  |  |  | 15 | 1.032 | 4.75 | 4.60 |

TABLE 2-continued

Inactivation of *Clostridium botulinum* 'Nanaimo' by high pressure and heat at different concentrations of salt, and at different pH values

| Treatment # | Pressure (MPa) | Temp (° C.) | pH | Salt (% w/v) | Pressure-hold time (min) | $F_{90° C.}$ at middle (min) | Log reduction for process | Log reduction per $F_{90° C.}$ min |
|---|---|---|---|---|---|---|---|---|
| 9 | 500 | 65 | 5.6 | 2.525 | 8 | 0.025 | 1.08 | 43.23 |
|   |     |    |     |       | 16 | 0.044 | 1.30 | 29.60 |
| 10 | 600 | 65 | 5.6 | 2.525 | 5 | 0.029 | 1.75 | 60.27 |
|    |     |    |     |       | 10 | 0.044 | 1.50 | 34.18 |
| 11 | 500 | 80 | 5.6 | 2.525 | 5 | 0.562 | 1.27 | 2.27 |
|    |     |    |     |       | 10 | 0.893 | 2.22 | 2.49 |
|    |     |    |     |       | 18 | 1.358 | 2.94 | 2.17 |
| 12 | 600 | 80 | 5.6 | 2.525 | 1 | 0.292 | 1.39 | 4.76 |
|    |     |    |     |       | 3 | 0.404 | 1.69 | 4.19 |
|    |     |    |     |       | 6 | 0.424 | 2.17 | 5.12 |
| 13 | 500 | 65 | 6.4 | 2.525 | 8 | 0.028 | 1.32 | 47.00 |
|    |     |    |     |       | 16 | 0.045 | 2.53 | 56.12 |
|    |     |    |     |       | 40 | 0.088 | 2.02 | 22.97 |
| 14 | 600 | 65 | 6.4 | 2.525 | 5 | 0.029 | 1.85 | 63.94 |
|    |     |    |     |       | 10 | 0.046 | 2.69 | 58.46 |
| 14 repeat | 600 | 65 | 6.4 | 2.525 | 5 | 0.027 | 1.36 | 50.46 |
|           |     |    |     |       | 10 | 0.038 | 2.12 | 55.68 |
|           |     |    |     |       | 30 | 0.073 | 3.72 | 51.01 |
| 15 | 500 | 80 | 6.4 | 2.525 | 5 | 0.505 | 2.48 | 4.92 |
|    |     |    |     |       | 10 | 1.034 | 3.08 | 2.98 |
|    |     |    |     |       | 18 | 1.533 | 2.40 | 1.57 |
|    |     |    |     |       | 18 repeat | 1.297 | 2.95 | 2.28 |
|    |     |    |     |       | 40 | 2.562 | 3.31 | 1.29 |
| 16 | 600 | 80 | 6.4 | 2.525 | 1 | 0.395 | 1.60 | 4.04 |
|    |     |    |     |       | 3 | 0.499 | 3.02 | 6.05 |
|    |     |    |     |       | 5 | 0.368 | 1.86 | 5.06 |
|    |     |    |     |       | 5 repeat | 0.372 | 2.29 | 6.16 |
|    |     |    |     |       | 15 | 1.010 | 4.18 | 4.14 |
| 17 | 450 | 72.5 | 6 | 1.75 | 8 | 0.155 | 1.17 | 7.53 |
|    |     |      |   |      | 16 | 0.277 | 1.38 | 4.99 |
|    |     |      |   |      | 25 | 0.434 | 1.85 | 4.27 |
| 18 | 650 | 72.5 | 6 | 1.75 | 5 | 0.142 | 2.13 | 15.01 |
|    |     |      |   |      | 10 | 0.126 | 2.42 | 19.18 |
| 19 | 550 | 57.5 | 6 | 1.75 | 15 | 0.010 | 1.57 | 156.75 |
|    |     |      |   |      | 30 | 0.016 | 1.69 | 105.88 |
| 20 | 550 | 87.5 | 6 | 1.75 | 1 | 0.914 | 2.97 | 3.25 |
|    |     |      |   |      | 3 | 1.728 | 4.47 | 2.59 |
| 21 | 550 | 72.5 | 5.2 | 1.75 | 8 | 0.151 | 1.60 | 10.58 |
|    |     |      |     |      | 16 | 0.296 | 1.79 | 6.05 |
|    |     |      |     |      | 40 | 0.418 | 2.33 | 5.58 |
| 22 | 550 | 72.5 | 6.8 | 1.75 | 9 | 0.158 | 1.59 | 10.08 |
|    |     |      |     |      | 11 | 0.187 | 2.05 | 10.95 |
|    |     |      |     |      | 30 | 0.328 | 4.08 | 12.45 |
| 23 | 550 | 72.5 | 6 | 0.2 | 8 | 0.128 | 1.54 | 12.02 |
|    |     |      |   |     | 16 | 0.231 | 2.11 | 9.15 |
|    |     |      |   |     | 30 | 0.316 | 2.70 | 8.54 |
| 24 | 550 | 72.5 | 6 | 3.3 | 8 | 0.120 | 1.22 | 10.21 |
|    |     |      |   |     | 16 | 0.233 | 1.62 | 6.96 |
|    |     |      |   |     | 40 | 0.423 | 2.63 | 6.22 |
| 25 | 550 | 72.5 | 6 | 1.75 | 8 | 0.168 | 1.57 | 9.36 |
|    |     |      |   |      | 16 | 0.287 | 2.05 | 7.13 |
|    |     |      |   |      | 30 | 0.329 | 3.55 | 10.78 |
| 26 | 550 | 72.5 | 6 | 1.75 | 8 | 0.165 | 1.62 | 9.83 |
|    |     |      |   |      | 16 | 0.253 | 2.14 | 8.48 |
| 27 | 550 | 72.5 | 6 | 1.75 | 8 | 0.116 | 1.52 | 13.12 |
|    |     |      |   |      | 16 | 0.234 | 2.42 | 10.36 |

Example 3

Heat and Heat Plus High Pressure Resistance of Non-Proteolytic *Clostridium botulinum* in Four Vegetable Purees Carrots, cauliflower and red onions were purchased fresh from a local produce market; peas were purchased frozen. Inactivation of *C. botulinum* Nanaimo was assessed in these four products, and in tryptone peptone glucose yeast extract (TPGY) media, using isothermal heat only processes of 90° C. for 2 minutes and 10 minutes, and using a high pressure process with the oil bath set at 90° C. and a pressure of 600 MPa. All processes were conducted in triplicate.

Preparation of Spore Crop

A new spore crop batch of *C. botulinum* Nanaimo was prepared. One loopful of a previously prepared spore crop (stock stored at −80° C.) was used to inoculate 20 mL of TPGY media (tryptone 50 g/L, bacteriological peptone 5 g/L, glucose 4 g/L, yeast extract 20 g/L and sodium thioglycollate 1 g/L, dissolved in 1 L of de-ionised water; pH adjusted to 7.0±0.2 prior to autoclaving at 121° C. for 15 minutes). The inoculated medium was incubated in an anaerobic cabinet for 72 hours at 30° C. Two phase medium was prepared in 500 mL tissue culture flasks by pouring 100 mL of melted TPGY with 1.5% agar into the flask and allowing solidification. Liquid TPGY (70 mL) was poured over the top and inoculated with 0.7 mL of the 72 hour culture. The two phase cultures were incubated with lids loosened for 4 days in the anaerobic cabinet at 30° C. Phase contrast microscopy was conducted periodically to observe the incidence of phase bright spores.

Cultures were harvested when the field of view contained at least 80% spores. The liquid phase of the culture was centrifuged (4000 g, 10 mins at 4° C.) to remove the medium, and the cells washed three times in chilled sterile deionised water. Spore suspensions were placed in 1 mL cryovials (Nalgene) and stored at −80° C. until use. The concentration of spores was enumerated for the first and last aliquot of the spore crop prior to freezing, by preparing serial dilutions in modified PA3679 (MPA) broth, and then pour plates using enumeration of clostridia medium (ECM). Plates were incubated in an anaerobic cabinet for 5 days at 30° C. prior to counting.

Preparation of Vegetable Purees and Media as Heating Menstruum.

Purees were prepared by combining 100 g vegetable roughly chopped and 100 g of 0.5% NaCl and then pureeing in a clean Sorvall Omnimix (Ultra-Turrax) on setting 5 for 30 seconds. For the carrot puree only, and for the TPYG media, low melting point agarose (Promega, Madison, USA) was prepared as a 4.5 g/L solution and added to the prepared puree or media in the ratio of 2 parts prewarmed media/puree to 1 part agarose to facilitate temperature control during high pressure processing; agarose was also added to heat only samples of carrot puree to permit comparison of inactivation between treatments.

Heat Only Treatments.

Heat resistance of the isolates was assessed using the screw cap tube method of Kooiman and Geers (1975). Briefly, vegetable puree or TPGY media (9.9±0.02 g) was aseptically dispensed into stainless steel tubes with sterile lids fitted with rubber septa. Tubes were immersed in an oil bath at 90° C. until the temperature had equilibrated and inactivation studies could commence. Spore crops stored at −80° C. were thawed and 100 μL drawn into a spinal needle (22 G, 3 in; BD Biosciences). All spore crops and needles were then stored on ice until required. Inoculation of temperature equilibrated sample tubes was carried out by injecting the thawed spore crop through the tube septum, to achieve an initial concentration of approximately $10^6$ spores/g in the heated sample. Residual inoculum was flushed from the syringe by washing it with contents of the stainless steel tube. Samples were removed from the oilbath at specified times, tubes were plunged into ice water to cool rapidly. Purees/media were tipped from the tube and the tubes rinsed with 2×2.5 ml of MPA to flush any residual puree from the tubes. This rinse volume was added to the initial tube contents and the volume adjusted for in the final calculations. Serial dilutions of the heat treated spore suspensions were prepared in MPA broth, and enumerated by pour plating into Eugon with starch agar (ESA). All plates were incubated at 30° C. in an anaerobic cabinet for 7 days before counting. Inactivation counts were compared with an inoculum count prepared by activating a $\frac{1}{100}$ dilution of spore crop at 80° C. for 10 mins in MPA broth (pre-equilibrated to 80° C.); enumeration was carried out as described for the heat treated samples.

Heat and High Pressure Treatment.

A separate cryovial of spore crop was defrosted on each day that experimental work was conducted, and stored on ice. For each sample, 4.95 g of product was inoculated with 50 μl of inoculum in a 28 ml plastic tube, to achieve an initial concentration of approximately $10^6$ spores/g. The contents of the tube were mixed and part of the contents dispensed into stainless steel sample tubes. A control (uninoculated) stainless steel tube was prepared of the same product and was fitted with a triple thermocouple, which was used to monitor and record the heating and cooling profile of the matched inoculated sample during each high pressure run.

Immediately after inoculation of the sample tube, both the (closed) sample tube and the triple thermocouple-fitted tube were placed in a salted ice-water slurry. The temperature was monitored until 2° C. was achieved in the centre of the uninoculated sample (as measured by the middle thermocouple), at which time the sample and the triple thermocouple were simultaneously transferred to individual pressure vessels in the kinetics unit, the top-plugs screwed into the pressure vessels and compression of the samples commenced. Upon obtaining the designated pressure of 600 MPa, timing was commenced, and depressurisation initiated after the appropriate pressure-hold time. Samples were removed from the unit as quickly as possible following depressurisation, and cooled briefly in the icewater slurry before sampling.

Enumeration of samples after treatment was carried out by transferring 1 mL of the treated sample into 9 mL MPA broth, from which serial dilutions (in MPA) were prepared. Survivors were enumerated by pour plating with ESA. All plates were incubated at 30° C. in an anaerobic cabinet for 7 days before counting. Inactivation counts were compared with an inoculum count prepared by activating a $\frac{1}{100}$ dilution of spore crop at 80° C. for 10 mins in MPA broth (pre-equilibrated to 80° C.); enumeration was carried out as described for the heat and high pressure processed samples.

Calculation of $F_{90° C.}$

Data from the triple thermocouple was used to calculate F90° C. (i.e. thermal equivalence, in min, to an isothermal process at 90° C.) values for each high pressure run, including the initial cooling of the sample, the pressure treatment, sample removal and final cooling stages. F90° C. values were calculated using the Trapezoidal Integration Method based on the thermal profile of the thermocouple in the centre of the sample, which consistently gave the highest F value due to the centre of the sample being the slowest to heat and also the slowest to cool. The z-value was assumed to be 10° C. for all calculations, rounded from the worst-case z-value for heat only inactivation of 9.84° C. reported by Gaze and Brown (1990) for non-proteolytic *C. botulinum* ATCC 9564 (Type E) in carrot homogenate.

Results.

In order to facilitate comparison of the isothermal heat only process and the non-isothermal heat and high pressure processes, F90° C. values were calculated for all processes. Theoretically, if high pressure synergistically contributes to inactivation by heat, then the level of inactivation observed for a heat and high pressure process with an F90° C. value of 2 min should be greater than that observed for a heat only process with equivalent F90° C. Pressure was shown to synergistically contribute to inactivation of *C. botulinum* Nanaimo in all vegetable purees and in TPYG media. Heat plus high pressure processes with F90° C. ranging between 2.1 and 4.9 min were more effective in inactivating *C. botulinum* Nanaimo than isothermal heat only processing at 90° C. for 10 min.

Similar levels of inactivation of *C. botulinum* Nanaimo was observed in all vegetable purees and in TPYG media. The greatest log reduction observed among the treatments trialled was 2.3 log cfu/g, for *C. botulinum* Nanaimo treated by heat and high pressure at 600 MPa at a calculated F90° C. value of 3.5 min.

Example—4

Thermal Process Evaluation

Vegetables samples (20×100 gram for each treatment) were prepared and treated with pressure and heat or heat alone in accordance with the table set forth below.

Samples were evaluated by a trained sensory panel. As compared to vegetables treated with heating alone, vegetables treated with heat and pressure had more of the qualities of raw vegetables, such as firmer, crunchier, more raw note and less cooked note. Plots of results of sensory evaluations are set forth in FIGS. 4-8.

| SAMPLE | TREATMENT |
| --- | --- |
| Baby Carrot | 600 MPa × 2 min @ 90° C. |
| | 10 min @ 90° C. |
| Cauliflower | 600 MPa × 2 min @ 90° C. |
| | 10 min @ 90° C. |
| Red Onion | 600 MPa × 2 min @ 90° C. |
| | 10 min @ 90° C. |
| Snap Pea | 600 MPa × 2 min @ 90° C. |
| | 10 min @ 90° C. |
| Asian Stir-fry Chicken and Vegetable in black-bean garlic sauce | 600 MPa × 2 min @ 90° C. 10 min @ 90° C. |

What is claimed is:

1. A process for reducing psychrotrophic spores including *C. botulinum* in a VP/MAP vegetable using pasteurization temperatures without sterilization, the process comprising the steps of:
    packaging a vegetable in a VP/MAP package under anaerobic conditions;
    heating the VP/MAP vegetable at atmospheric pressure to pasteurization temperatures less than about 88° C. to form a pasteurized VP/MAP vegetable without sterilizing the VP/MAP vegetable;
    pressurizing the pasteurized VP/MAP vegetable at a pressure of more than about 450 MPa and less than about 820 MPa, such that the temperature of the pressurized VP/MAP vegetable is more than about 55° C. and less than about 88° C., wherein the process causes about a 3.5 log reduction of anaerobic psychrotrophic spores including *C. botulinum* in the VP/MAP vegetable without sterilizing the VP/MAP vegetable, without adjusting salt, acidity or water activity, and without adding preservatives.

2. The process of claim 1 wherein the temperature of the pressurized VP/MAP vegetable is between about 57.5° C. and about 87.5° C.

3. The process of claim 2 wherein the temperature of the pressurized VP/MAP vegetable is between about 57.5° C. and about 72.5° C.

4. The process of claim 3 wherein the temperature of the pressurized VP/MAP vegetable is between about 65° C. and about 72.5° C.

5. The process of claim 1 wherein the pasteurized VP/MAP vegetable is pressurized at a pressure of less than about 650 MPa.

6. The process of claim 5 wherein the pasteurized VP/MAP vegetable is pressurized at a pressure of between about 500 MPa and about 650 MPa.

7. The process of claim 6 wherein the pasteurized VP/MAP vegetable is pressurized at a pressure of between about 550 MPa and about 650 MPa.

8. The process of claim 5 wherein the pasteurized VP/MAP vegetable is pressurized at a pressure of between about 550 MPa and about 600 MPa.

9. The process of claim 1 wherein the step of pressurizing is for a time of about 30 minutes or less.

10. The process of claim 9 wherein the step of pressurizing is for a time of about 20 minutes or less.

11. The process of claim 10 wherein the step of pressurizing is for a time of about 10 minutes or less.

12. The process of claim 11 wherein the step of pressurizing is for a time of more than about 30 seconds.

13. The process of claim 12 wherein the step of pressurizing is for a time of more than about 1 minute.

14. The process of claim 13 wherein the step of pressurizing is for a time of more than about 2 minutes.

15. The process of claim 1 further comprising the steps of returning the vegetable to atmospheric pressure and cooling the vegetable to prevent growth of mesophilic micro-organisms in the vegetable.

16. The process of claim 15 wherein the vegetable is cooled to a temperature of between about 0° C. to about 10° C.

17. The process according to claim 1 wherein the psychrotrophic spore is a non-proteolytic *C. botulinum* spore.

18. The process according to claim 1 wherein the spore is a *C. botulinum* Type E spore.

19. The process of claim 1, wherein the VP/MAP vegetable is pressurized using a single pulse of pressure for about 3 minutes or less.

20. A process for reducing psychrotrophic spores including *C. botulinum* in a VP/MAP food product using pasteurization temperatures without sterilization, the process comprising the steps of:
    packaging a food product in a VP/MAP package under anaerobic conditions;
    heating the VP/MAP food product at atmospheric pressure to pasteurization temperatures less than about 88° C. to form a pasteurized VP/MAP food product without sterilizing the VP/MAP food product;
    pressurizing the pasteurized VP/MAP food product at a pressure of more than about 450 MPa and less than about 820 MPa, such that the temperature of the pressurized VP/MAP food product is more than about 55° C. and less than about 88° C., for a period of time sufficient to reduce anaerobic psychrotrophic spores including *C. botulinum* in the VP/MAP food product by about 3.5 log without sterilizing the VP/MAP food product, without adjusting salt, acidity or water activity, and without adding preservatives.

21. A process for reducing psychrotrophic spores including *C. botulinum* in a VP food product using pasteurization temperatures without sterilization, the process comprising the steps of:
    packaging a food product in a VP package under anaerobic conditions;
    heating the VP food product at atmospheric pressure to pasteurization temperatures less than about 88° C. to form a pasteurized VP food product without sterilizing the VP food product;
    pressurizing the pasteurized VP food product at a pressure of more than about 450 MPa and less than about 820 MPa, such that the temperature of the pressurized VP food product is more than about 55° C. and less than about 88° C., for a period of time sufficient to reduce anaerobic psychrotrophic spores including *C. botulinum* in the VP food product by about 3.5 log without sterilizing the VP food product, without adjusting salt, acidity or water activity, and without adding preservatives.

* * * * *